Jan. 18, 1949.  F. C. HANSON  2,459,379
BELT TIGHTENING DEVICE
Filed July 10, 1944
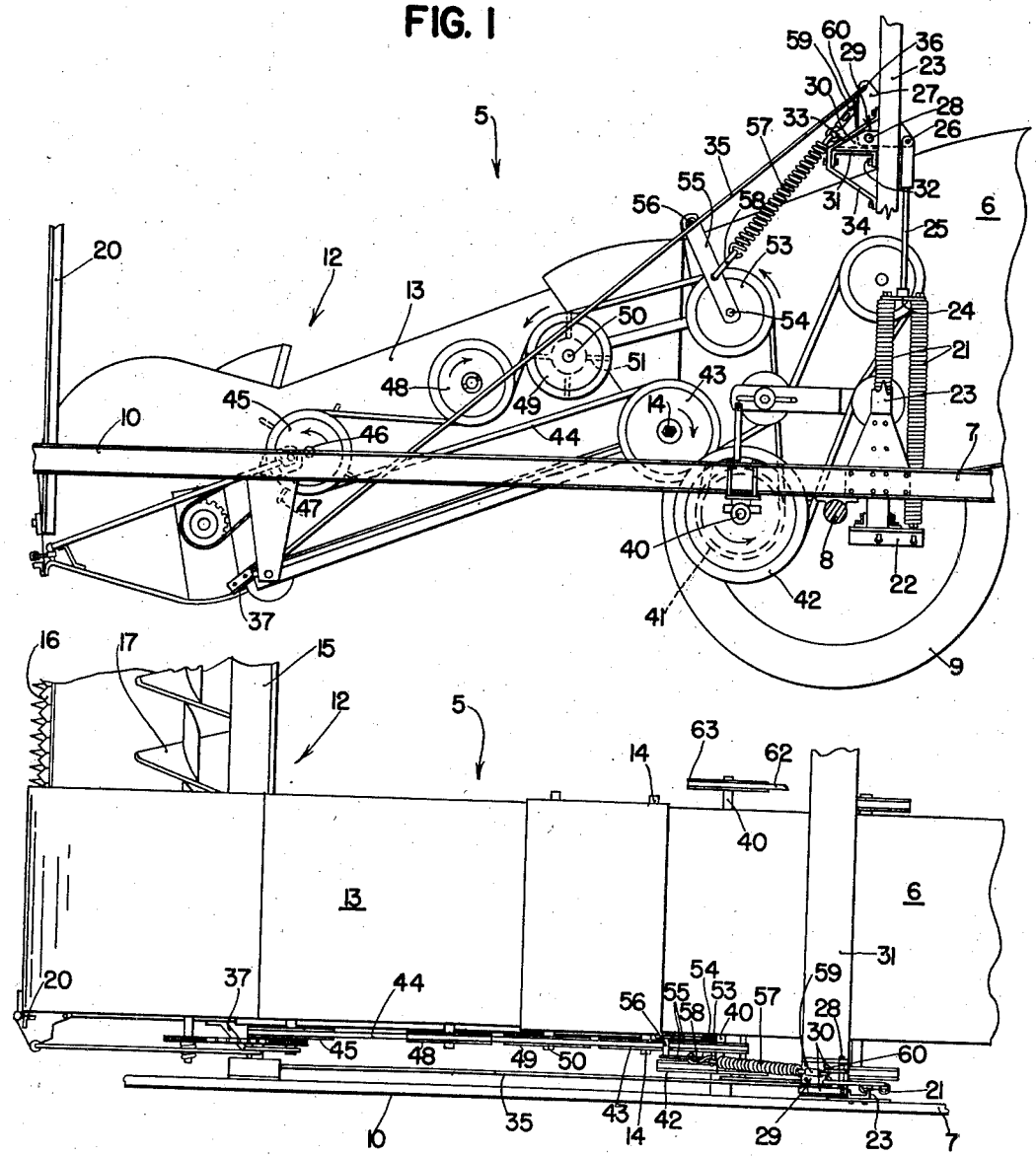
FIG. 1
FIG. 2
WITNESS
E. B. Bjurstrom
INVENTOR.
FREDRICK C. HANSON
ATTORNEYS Patented Jan. 18, 1949

2,459,379

UNITED STATES PATENT OFFICE 2,459,379

BELT-TIGHTENING DEVICE

Fredrick C. Hanson, Cordova, Ill., assignor to Deere & Company, Moline, Ill., a corporation of Illinois Application July 10, 1944, Serial No. 544,288

9 Claims. (Cl. 74—242.11)

The present invention relates generally to power transmitting mechanism and more particularly to devices for maintaining a constant tension in a power transmitting belt or the like, with particular reference to power transmission devices for transmitting power between mechanisms supported on two or more supporting frames which are shiftable relative to each other. In such cases, the length of the path of the power transmitting belt or chain changes with various positions of the supports relative to each other, and therefore in order to maintain a tension in the power transmitting belt it is necessary to provide an automatic take-up for the belt tightening idler, as the latter must be shifted to accommodate different relative positions of the frames. The conventional method of providing a take-up of this nature, is to mount the belt tightening idler on a spring, the latter being anchored to one of the frames with a certain amount of initial tension and with sufficient length to accommodate a substantial relative movement between the frames.

However, in some cases, there is so much relative movement between the frames that even though a long spring be employed, there is a wide difference in tension of the spring between the two extremes of movement of the frames, so that the tension in the belt is insufficient at one end of the range of relative movement, to permit the belt to transmit its normal power, while at the other extremity of movement of the supporting frames the tension in the power transmitting belt due to the extreme spring pressure, is high enough to over-stress the belt, thereby causing failure or rapid deterioration of the latter.

Therefore, it is an object of the present invention to provide a belt tightener of this general nature but which maintains a substantially constant tension in the power transmitting belt over a wide range of relative movement of the supporting frames. In the accomplishment of this object, the spring which actuates the belt tightening idler is anchored to a part which moves with the frames and is so proportioned that the amount of movement of the part corresponds to the amount of change in the length of the path of the belt during movement of the frames, whereby the idler spring is shifted during such relative movement, to maintain the length of the spring substantially constant and thereby maintaining a substantially constant pressure against the belt tightening idler, whereby substantially constant tension is maintained in the power transmitting belt throughout the range of relative movement of the frames.

These and other objects and advantages of my invention will be apparent to those skilled in the art after a consideration of the following description, in which reference is had to the drawings appended hereto, in which Figure 1 is a side elevational view of the front portion of a harvester thresher in which the present invention is embodied.

Figure 2 is a plan view of the arrangement shown in Figure 1.

Referring now to the drawings, reference numeral 5 indicates in its entirety a harvesting machine of the type known as a harvester thresher or combine, comprising a main body portion 6 comprising a crop treating housing, within which is disposed the usual threshing cylinder and separating mechanism (not shown). The housing or body 6 is mounted on a generally horizontally disposed main frame 7 which is carried on a transverse axle 8, the latter being journaled at opposite ends thereof, respectively, in a pair of ground engaging supporting wheels 9. The frame 7 has a forward portion 10 which serves as a draft frame and has provision for connection with a tractor or other draft device (not shown).

A harvesting unit 12 is mounted on the forward end of the crop treating unit 6 and comprises a fore and aft extending feeder housing 13 which is pivotally connected by means of a transverse shaft 14 to the forward end of the thresher body 6. At the forward end of the feeder housing 13 is mounted a harvester platform 15 extending laterally from the feeder housing 13 and supported thereon. A cutter bar 16 extends along the forward edge of the platform 15, which severs the crops from the field and an auger 17 is provided for moving the harvested crops into the forward end of the feeder house 13 in a manner well-known to those skilled in the art.

The harvester unit 12 is raised and lowered about the transverse axis of the shaft 14 through a suspension member 20 which is attached to the front corner of the feeder house 13 and extends upwardly to a control device mounted on an operator's platform above the draft frame 10, none of which is shown in the drawing since it constitutes no part of the present invention.

The harvester unit 12 is counterbalanced to facilitate vertical adjustment, by means of a pair of counterbalancing springs 21 disposed in a vertical position alongside the thresher body 6. The lower ends of the springs 21 are anchored to a bracket 22, which is secured to the lower end of a vertical frame member 23 fixed to the main frame 7 and extending upwardly therefrom. The vertical member 23 is in the form of a structural channel beam a portion of which is broken away in Figure 1 to show the springs 21. The upper ends of the springs 21 are secured to a yoke 24, which is connected by a vertical link 25 to a pivot pin 26 in one corner of a triangular plate 27 which serves as a bell crank and is fixed to a rockshaft 28 disposed for rocking movement about a transverse axis. The rockshaft 28 is journaled at opposite ends thereof, respectively, in a supporting bracket 29 comprising a horizontal plate having upwardly turned flanges 30 disposed in laterally spaced longitudinally extending planes. The bracket 29 is mounted on an inverted channel-shaped frame member 31, which extends transversely across the top of the thresher housing 6 and is secured to the vertical frame member 23 by a bolt 32 and also by a pair of inclined braces 33, 34, above and below the channel member 31, respectively. A tension rod 35 is swingably connected at 36 to the third corner of the triangular plate 27 and extends forwardly and downwardly therefrom and is connected at its forward end to the forward end of the feeder house 13 by means of a bracket 37. Thus, the tension of the springs 21 tends to pull downwardly through the link 25, causing the bell crank 27 to tend to swing about the axis of the rockshaft 28 in a clockwise direction as viewed in Figure 1, thereby exerting a tension on the rod 35 to exert a lifting force on the harvesting unit.

The harvesting unit 12 is provided with several different pieces of harvesting and conveying equipment, the details of which are not in themselves important in this disclosure, for the present invention is concerned only with the drive mechanism for the various equipment. Power is supplied from a drive shaft 40 journaled beneath the forward end of the thresher housing 6, on which is mounted a pair of V-belt sheaves 41, 42. The drive sheave 41, with which the present invention is more directly concerned, drives a flexible endless belt of the side driving type, which is trained over a sheave 43 fixed to the shaft 14 for driving an endless type conveyor (not shown) within the feeder house 13, which conveys the crop material from the discharge end of the auger 17 to the front end of the thresher housing 6. The belt 44 extends forwardly and is trained over a sheave 45 fixed to a shaft 46, on which is mounted a beater 47, which disengages the crop material from the auger. The belt 44 is trained around the sheave 45 and passes under an idler sheave 48 and over a drive sheave 49 which is mounted on a shaft 50, on which is disposed a second beater 51 within the housing 13.

A device is provided for maintaining the belt 44 tight as the harvesting unit 12 swings vertically about the axis of the transverse shaft 14, and comprises a belt tightening idler sheave 53 which is journaled on a shaft 54 carried between a pair of swingable arms 55 which are pivotally mounted at 56 for swinging movement about a transverse axis. The belt 44 is trained over the belt tightener sheave 53 and returns to the driving pulley 41. A tension spring 57 is connected to a fitting 58 attached to the mid-portion of the arm 55 and extends upwardly and rearwardly therefrom and is connected by a turnbuckle 59 to an arm 60 fixed to the rockshaft 28. The turnbuckle 59 is so adjusted that an initial tension is placed in the spring 57, which urges the sheave 53 upwardly and rearwardly to take up the slack in the belt 44 and maintain the proper amount of tension therein.

When the harvesting unit 12 is raised about the transverse axis of the shaft 14, the sheave 49 swings with the feeder unit 13 in a direction toward the idler sheave 53; therefore if the latter were mounted in a fixed position, the belt 44 would be loosened by this movement of the harvester unit. Furthermore, if the spring 57 were anchored at its upper end to a relatively stationary part of the frame, it would take up the slack in the belt 44 as the harvester unit is raised, but the tension in the spring 57 would decrease with upward movement of the harvester unit and thereby decrease the tension in the driving belt 44, with the result that in the upper portion of the range of movement of the harvester unit, the tension in the spring 57, and therefore the tension in the belt 44, would be much less than in the lowered position of the harvesting unit 12. However, since the arm 60 swings upwardly and rearwardly with the rockshaft 28 when the harvesting unit is raised, at substantially the same rate as the movement of the idler sheave 53, the length of the spring 57 and hence the tension in the latter is maintained substantially constant for all positions within the range of vertical movement of the harvesting unit 12. Hence, with a substantially constant tension in the spring 57, the tension in the belt 44 is also maintained substantially constant for all positions within the normal range of movement of the harvesting unit. By this means, the operation of the belt 44 is independent of the adjustment of the harvesting unit about the axis of the shaft 14 and reduces the size of the spring 57 to that minimum which is required for applying a pressure against the idler sheave, without any necessity for taking up extra slack in the belt 44 caused by vertical movement of the harvesting unit 12.

Power is supplied to the drive shaft 40 through a belt 62 which engages a sheave 63 mounted on the opposite end of the shaft 40, which extends outwardly from the opposite side of the thresher body 6. The belt 62 receives power from an engine mounted on the combine in a manner which is well-known to those skilled in the art and therefore the details of which are not shown and described herein.

I claim:

1. In combination, a pair of frames connected together by means providing for relative shifting movement therebetween, a rockshaft mounted on one of said frames and connected with the other of said frames by means causing said rockshaft to rock coincidentally to said relative shifting movement, power transmitting mechanism including a sheave journaled on said other frame, an idler mounted on said one frame by means providing for shifting movement toward and away from said sheave, a power transmitting belt trained over said sheave and said idler, and a connection between said idler and said rockshaft for shifting said idler coincidentally with relative movement of said frames, to maintain a substantially constant belt tension.

2. In a harvester comprising a crop treating unit and a harvesting unit swingably connected together, a rockshaft mounted on said crop treating unit and connected with said harvesting unit by means causing said rockshaft to rock coincidentally to swinging movement of said harvesting unit, power transmitting mechanism including a sheave journaled on said harvesting unit, an idler mounted on said crop treating unit by means providing for shifting movement toward and away from said sheave, a power transmitting belt trained over said sheave and said idler, and a connection between said idler and said rockshaft for shifting said idler coincidentally with swinging movement of said harvesting unit to maintain a substantially constant belt tension.

3. In combination, a pair of frames connected together by means providing for relative vertical shifting movement therebetween, a rockshaft journaled on one of said frames, arm means on said rockshaft connected with the other of said frames, means connected with said arm means for exerting a lifting force therethrough upon said other frame, power transmitting mechanism including a sheave journaled on said other frame, an idler mounted on said one frame by means providing for shifting movement toward and away from said sheave, a power transmitting belt trained over said sheave and idler, and a connection between said idler and said arm means for shifting said idler coincidentally with vertical shifting movement of said frames, to maintain a substantially constant belt tension.

4. In a harvester comprising a crop treating unit and a harvesting unit swingably connected together, a rockshaft mounted on said crop treating unit, arm means on said rockshaft connected with said harvester unit, means connected with said arm means for exerting a lifting force therethrough upon said harvester unit, power transmitting mechanism including a sheave journaled on said harvesting unit, an idler mounted on said crop treating unit by means providing for shifting movement toward and away from said sheave, a power transmitting belt trained over said sheave and said idler, and a connection between said idler and said arm means for shifting said idler coincidentally with vertical shifting movement of said harvesting unit to maintain a substantially constant belt tension.

5. In combination, a pair of frames connected together by means providing for relative vertical shifting movement therebetween, a rockshaft journaled on one of said frames, arm means on said rockshaft connected with the other of said frames, means connected with said arm means for exerting a lifting force therethrough upon said other frame, power transmitting mechanism including a sheave journaled on said other frame, an idler mounted on said one frame by means providing for shifting movement toward and away from said sheave, a power transmitting belt trained over said sheave and idler, and a resilient connection between said idler and said arm means for maintaining a pressure against said idler to hold a predetermined tension in said belt, said arm means being adapted to shift said resilient connection when said frames are shifted vertically relative to each other, to maintain a substantially constant pressure against said idler, thereby holding a substantially constant tension in said belt in all positions of said frames.

6. In a harvester comprising a crop treating unit and a harvesting unit swingably connected together, a rockshaft mounted on said crop treating unit, arm means on said rockshaft connected with said harvester unit, means connected with said arm means for exerting a lifting force therethrough upon said harvester unit, power transmitting mechanism including a sheave journaled on said harvesting unit, an idler mounted on said crop treating unit by means providing for shifting movement toward and away from said sheave, a power transmitting belt trained over said sheave and said idler, and a resilient connection between said idler and said arm means for maintaining a pressure against said idler to hold a predetermined tension in said belt, said arm means being adapted to shift said resilient connection when said frames are shifted vertically relative to each other, to maintain a substantially constant pressure against said idler, thereby holding a substantially constant tension in said belt in all positions of said frames.

7. In combination, a pair of frames pivotally connected together by means providing for relative swinging movement, a rockshaft journaled on one of said frames and connected with the other of said frames by means causing said rockshaft to rock coincidentally to relative swinging movement of said frames, a pair of power transmitting sheaves journaled on said frames, respectively, a power transmitting belt trained over said sheaves, an idler engaging said belt and mounted on one of said frames by means providing for shifting movement generally transversely of said belt to adjust the tension in the latter, and a connection between said idler and said rockshaft for shifting said idler coincidentally with relative swinging movement of said frames.

8. In a harvester comprising a body frame and a harvesting unit frame pivotally connected together by means providing for relative swinging movement, a rockshaft journaled on one of said frames and connected with the other of said frames by means causing said rockshaft to rock coincidentally to relative swinging movement of said frames, a pair of power transmitting sheaves journaled on said frames, respectively, a power transmitting belt trained over said sheaves, an idler engaging said belt and mounted on one of said frames by means providing for shifting movement generally transversely of said belt to adjust the tension in the latter, and a connection between said idler and said rockshaft for shifting said idler coincidentally with relative swinging movement of said frames.

9. In a harvester comprising a body frame and a harvesting unit frame pivotally connected together by means providing for relative swinging movement, a rockshaft journaled on said body frame and connected with said harvesting unit frame by means causing said rockshaft to rock coincidentally to relative swinging movement of said frames, a pair of power transmitting sheaves journaled on said frames, respectively, a power transmitting belt trained over said sheaves, an idler engaging said belt and mounted on said body frame by means providing for shifting movement generally transversely of said belt to adjust the tension in the latter, and a connection between said idler and said rockshaft for shifting said idler coincidentally with relative swinging movement of said frames.

FREDRICK C. HANSON.

REFERENCES CITED

The following references are of record in the file of this patent:

UNITED STATES PATENTS

| Number | Name | Date |
| --- | --- | --- |
| 664,505 | Richards | Dec. 25, 1900 |
| 2,135,621 | Millard | Nov. 8, 1938 |
| 2,314,259 | Welty | Mar. 16, 1943 |